(12) United States Patent
Zauner

(10) Patent No.: US 7,213,544 B2
(45) Date of Patent: May 8, 2007

(54) EXHAUST-OUTLET CONTROL FOR 2-STROKE ENGINE

(75) Inventor: Günther Zauner, Peuerbach (AT)

(73) Assignee: BRP-Rotax GmbH & Co. KG, Gunskirchen (AT)

( * ) Notice: Subject to any disclaimer, the term of this patent is extended or adjusted under 35 U.S.C. 154(b) by 0 days.

(21) Appl. No.: 11/045,361

(22) Filed: Jan. 31, 2005

(65) Prior Publication Data

US 2005/0166872 A1 Aug. 4, 2005

Related U.S. Application Data

(60) Provisional application No. 60/540,006, filed on Jan. 30, 2004.

(51) Int. Cl.
*F02B 25/00* (2006.01)
(52) U.S. Cl. .................................. 123/65 PE
(58) Field of Classification Search ............. 123/65 PE
See application file for complete search history.

(56) References Cited

U.S. PATENT DOCUMENTS

| | | | |
|---|---|---|---|
| 4,364,346 A | 12/1982 | Shiohara | |
| 4,998,512 A | 3/1991 | Masuda et al. | |
| 5,000,131 A | 3/1991 | Masuda | |
| 5,063,887 A | 11/1991 | Ozawa et al. | |
| 5,063,888 A | 11/1991 | Ozawa et al. | |
| 5,220,890 A | 6/1993 | Koriyama | |
| 5,373,816 A | 12/1994 | Asai et al. | |
| 5,537,958 A | 7/1996 | Nishimura et al. | |
| 5,588,402 A | 12/1996 | Lawrence | |
| 5,598,813 A | 2/1997 | Masuda et al. | |
| 5,605,119 A | 2/1997 | Masuda et al. | |
| 5,752,476 A * | 5/1998 | Nakamura | 123/65 PE |
| 5,873,334 A | 2/1999 | Heinrich | |
| 6,021,748 A | 2/2000 | Motose | |
| 6,155,374 A | 12/2000 | Uchida | |
| 6,158,215 A | 12/2000 | Bosch et al. | |
| 6,189,494 B1 | 2/2001 | Nagumo et al. | |
| 6,216,648 B1 * | 4/2001 | Spaulding | 123/65 PE |
| 6,244,227 B1 * | 6/2001 | Matte | 123/65 PE |
| 6,273,036 B1 * | 8/2001 | Uchida et al. | 123/65 PE |
| 6,418,890 B1 | 7/2002 | Dopona | |

FOREIGN PATENT DOCUMENTS

| | | |
|---|---|---|
| AT | 380537 B | 6/1986 |
| AT | 399204 B | 4/1995 |
| AT | 407555 B | 4/2001 |
| CA | 2355038 | 2/2003 |
| CA | 2355038 A1 * | 2/2003 |
| DE | 2927521 | 1/1981 |
| DE | 19535069 A1 | 3/1996 |
| EP | 0141650 A2 | 5/1985 |
| JP | 05133230 A2 | 5/1993 |
| JP | 07279675 A2 | 10/1995 |
| JP | 10153272 | 6/1998 |
| JP | 11050849 A * | 2/1999 |
| JP | 11132045 | 7/2002 |

* cited by examiner

*Primary Examiner*—Noah P. Kamen
(74) *Attorney, Agent, or Firm*—Osler, Hoskin & Harcourt LLP

(57) ABSTRACT

An exhaust valve assembly for a two stroke internal combustion engine having a cylinder with at least one main exhaust port and one auxiliary exhaust port is disclosed. The assembly comprises a main exhaust valve for at least partially closing the main exhaust port, an auxiliary exhaust valve for at least partially closing the auxiliary exhaust port, the auxiliary exhaust valve being separate from the main exhaust valve, and an actuator for actuation of the main exhaust valve and the auxiliary exhaust valve, wherein the actuator is connected to the main exhaust valve and the auxiliary exhaust valve is connected to the actuator by the main exhaust valve.

20 Claims, 8 Drawing Sheets

Figure 1:
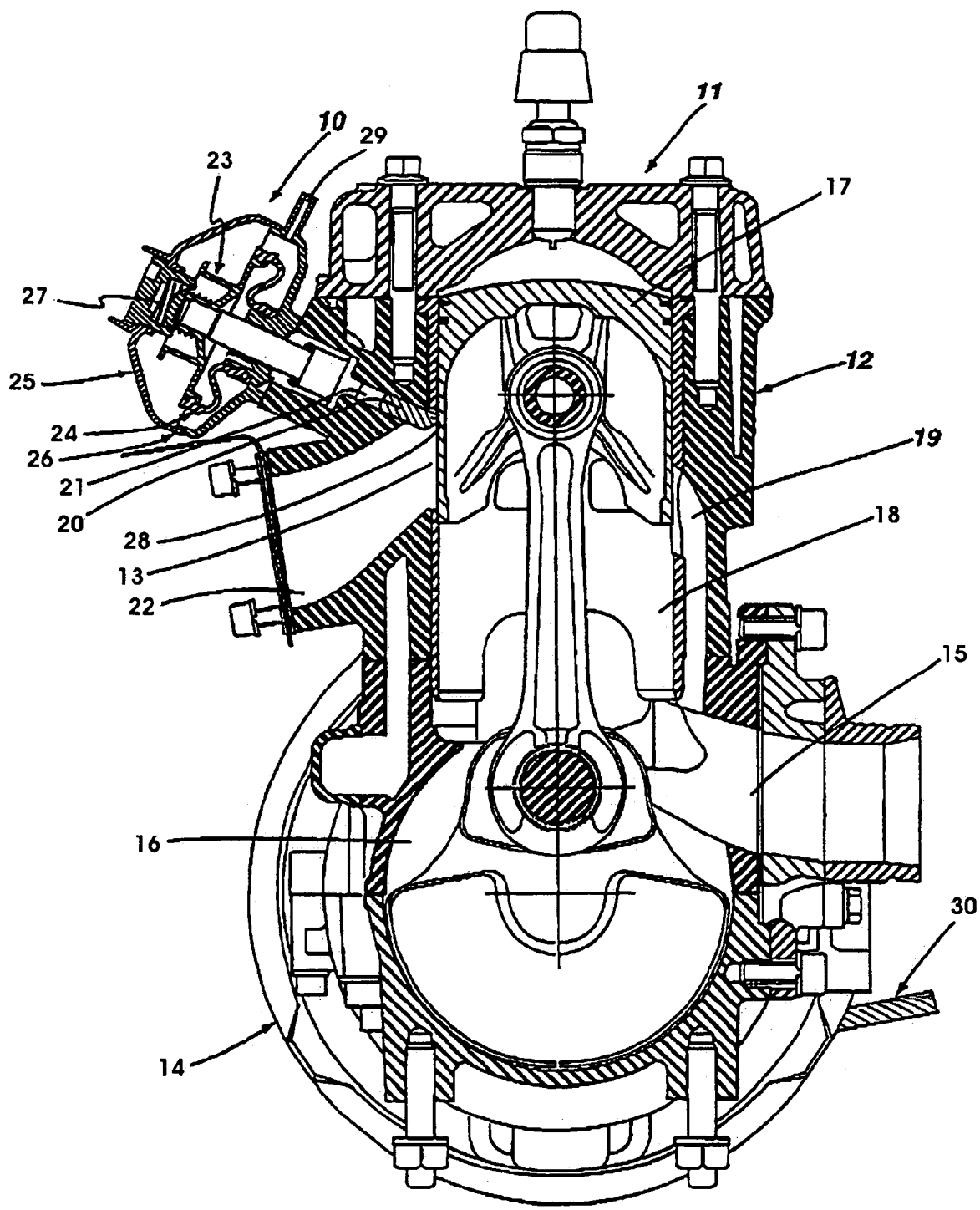

Fig. 3
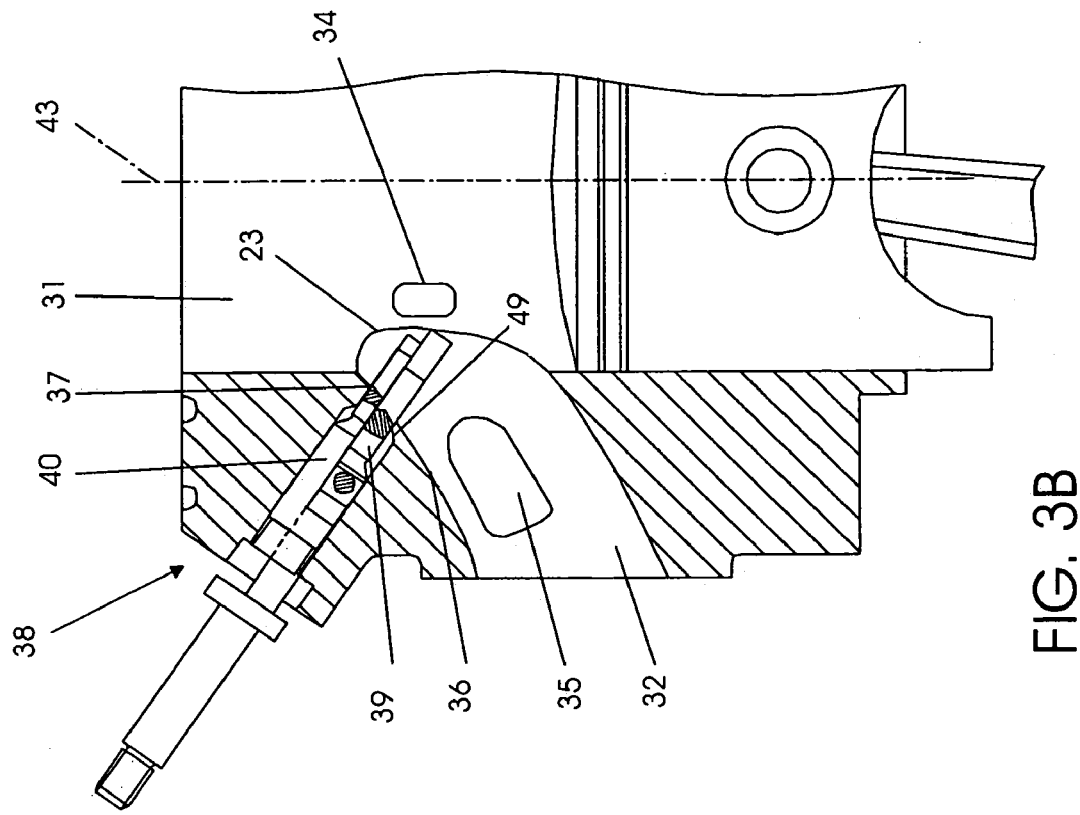
FIG. 3B
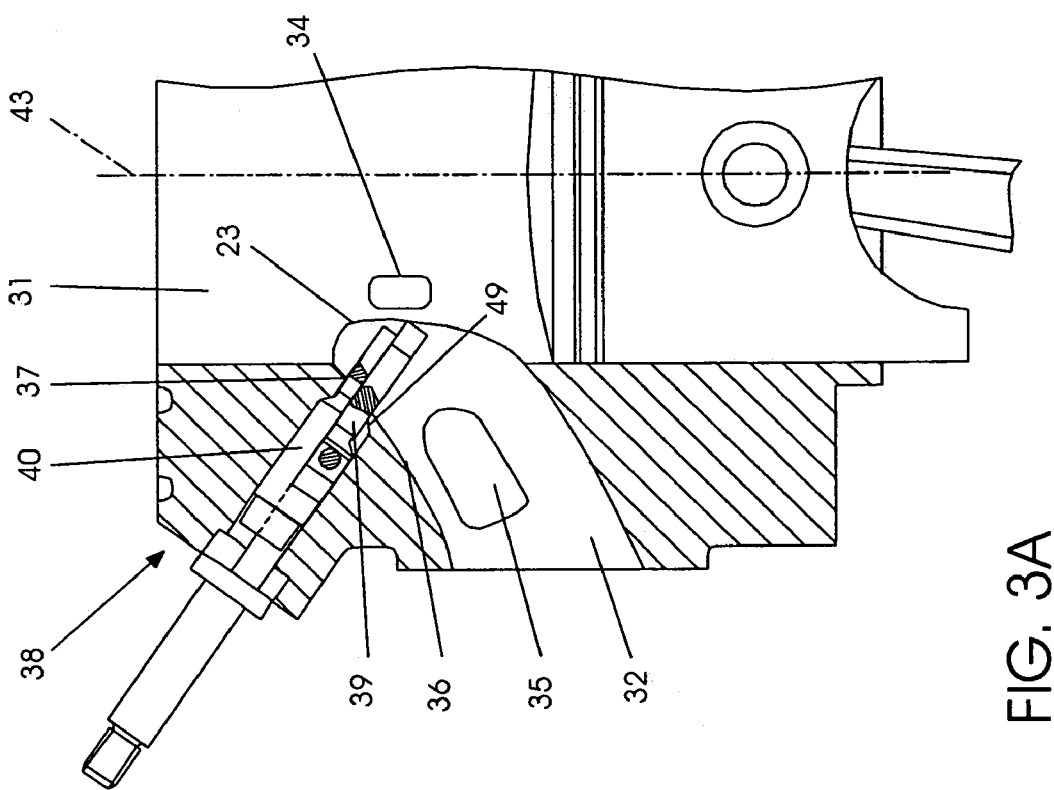
FIG. 3A

Fig. 4
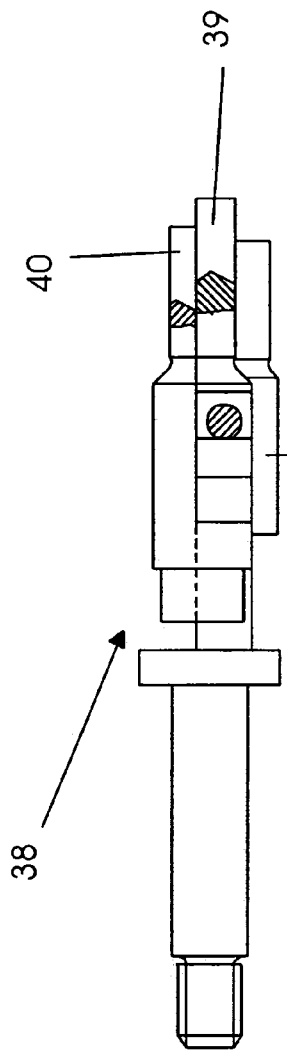
FIG. 4A
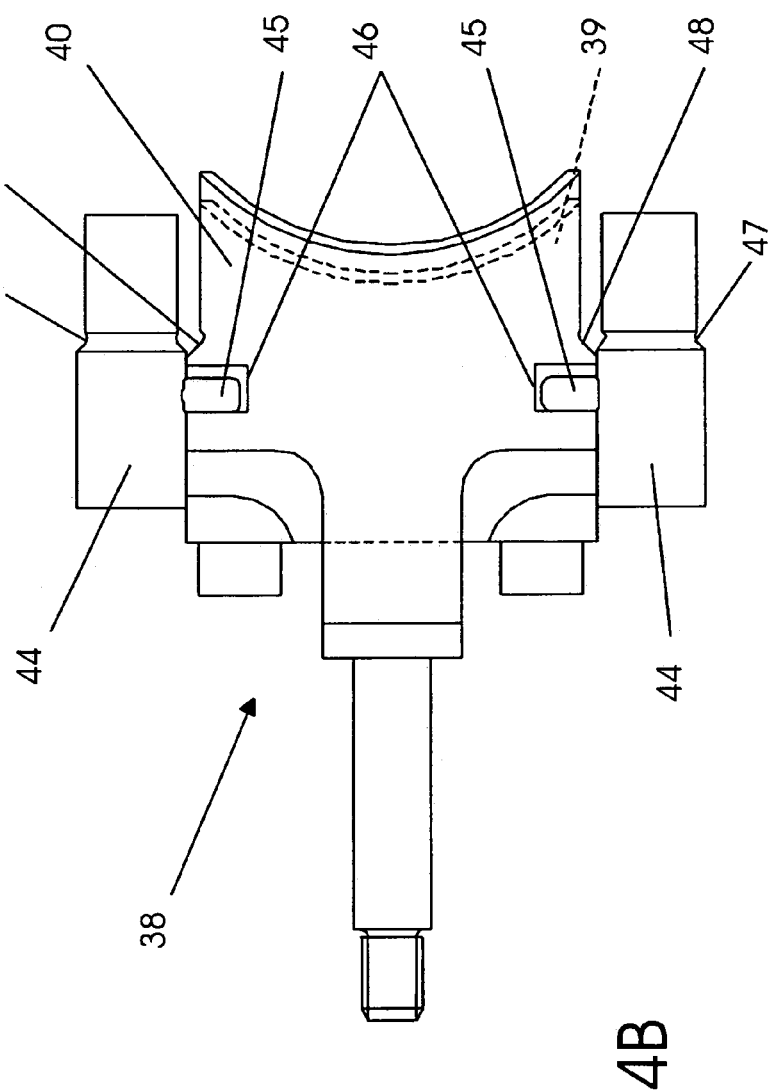
FIG. 4B

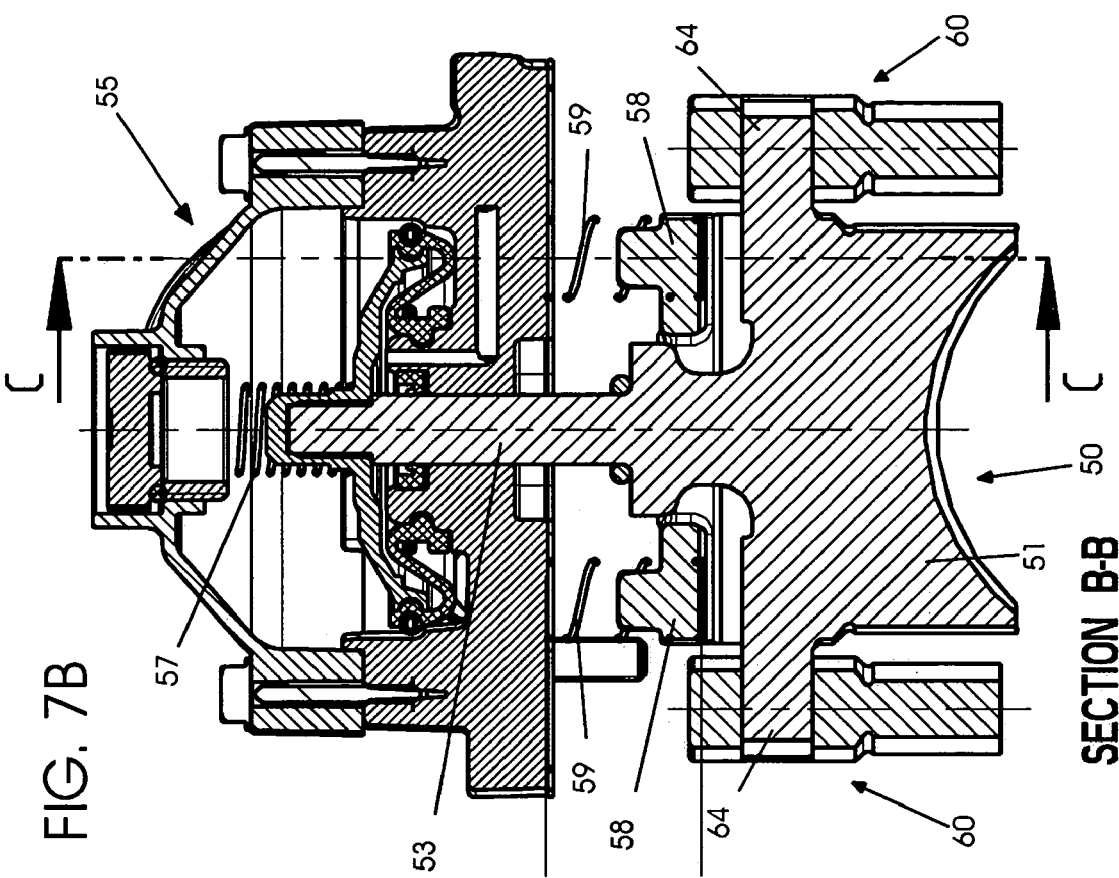

EXHAUST-OUTLET CONTROL FOR 2-STROKE ENGINE

The present invention claims priority to U.S. Provisional Application Ser. No. 60/540,006, which was filed Jan. 30, 2004, the entirety of which is hereby incorporated into the present application by reference.

BACKGROUND OF THE INVENTION

1. Field of the Invention

The present invention relates to an exhaust control valve assembly of a two stroke internal combustion engine. More particularly, the invention relates to a technically efficient exhaust control assembly wherein both the main exhaust control valve and the at least one auxiliary exhaust control valve can be controlled by only one actuator.

2. Discussion of the Prior Art

In order to ensure that two-cycle internal combustion engines can achieve a high peak power output at high engine speeds, care must be taken to ensure that the cylinder is well charged and that there are the smallest possible charge losses in the upper part of the engine-speed range; this can be achieved by exploiting resonance effects, i.e., by appropriately early opening of the exhaust passage. However, because of the comparatively great vertical dimension of the cross section of the exhaust outlet, in the mid and lower engine-speed ranges this matching of the exhaust system to the peak power output of the internal combustion engine causes not only a noticeable loss of usable capacity but also a marked increase in charge losses. As a result, torque is reduced and specific fuel consumption increases. An increase in torque with simultaneously reduced fuel consumption can be achieved in the lower engine speed ranges only by having the exhaust outlet open for a shorter time. In this connection, it is known, for example from AT 380 537 B, that a control slide valve can be fitted in the exhaust passage. This control slide valve is supported so as to slide in a through guide that is radial relative to the cylinder, in the side wall of the exhaust passage that is proximate to the cylinder head. At its free face end, this control slide valve has a control edge that is matched to the cylinder bore so that, when the control valve is in its working position, in which it is advanced against the cylinder, the vertical dimension of the exhaust outlet cross-section is partially covered. This results in a corresponding reduction of the exhaust period because of the delayed opening and earlier closing of the exhaust passage, and thus to improved charging of the cylinder in the middle and lower speed ranges.

If, in addition to a main exhaust outlet, secondary side exhaust outlets that are connected through channels to the exhaust passage that is connected to the main exhaust outlet are provided in the cylinder in order to improve exhaust conditions at the beginning and at the end of the exhaust gas discharge, then these secondary exhaust outlets are blocked off, for example by cylindrical shutoff bodies, in order to reduce the exhaust period. These shutoff bodies pass through the side passages, and either can rotate or slide between a closed position and an open position, thereby closing or opening the secondary exhaust outlets. The main control exhaust valve that is provided in the main exhaust passage and which is designed as a control flap, is so supported in bearings such that it can rotate or slide in the area of the side wall of the exhaust passage that is proximate to the cylinder head, and so that it can also be rotated or slid partially into the exhaust passage as to reduce the effective vertical dimension of the main exhaust outlet. In order that the cylindrical shutoff bodies, which incorporate a recess for releasing the side channels, can be actuated as a function of control flap, the control flap—whose axis of pivot extends parallel to a tangent to the cylinder—is connected through a sliding-block guide to the cylindrical shutoff bodies. One important disadvantage of this known exhaust period control are the considerable design costs that are occasioned, on the one hand, by the cylindrical shutoff bodies in the side channels, which must be supported in bearings so as to be rotatable and, on the other hand, by the necessary drive connection between these shutoff bodies and the control flap valve, the axis of pivot of which is offset by an angle of 90° relative to the axes of rotation of the shutoff bodies.

Finally, EP 0 141 650 A2 describes how the side secondary exhaust outlet, which is adjacent to the main exhaust outlet, is controlled by means of a shutoff slide as a function of engine speed, so that the secondary exhaust outlet is first opened at higher speeds. However, this known design incorporates no control body for controlling the exhaust period of the main exhaust outlet.

JP 7-279675 A describes a system for controlling the open position of the secondary exhaust outlet by means of rack drives, as a function of the open position of the control slide valve for a main exhaust outlet. This system is costly from the standpoint of construction and requires a great deal of space.

In order to keep the gap between the slide valve and the piston as small as possible along the whole of the positioning travel when there is an angle between the slide-valve guide and the axis of the cylinder, and to ensure that when it is in its lower, extended, position, the slide valve rests snugly against the radius of the cylinder wall across the complete width of the exhaust outlet slot, it is known from DE 195 35 069 A1 that the control slide valve can be provided with a guide surface that is curved in the direction of the cylinder axis, this guide surface being a part of a curve that is perpendicular to the direction of movement of the slide valve.

It is known from prior art publication AT399204B to design the main exhaust control valve as a two-part sliding valve. By this design two different settings of the port timing can be established.

It is further known in the prior art to provide a exhaust control valve having a main exhaust valve and integrally formed auxiliary exhaust valves. Due to the big dimension of such a exhaust control valve such a design is especially susceptible to jamming following thermal expansion of the components.

It is further known from the prior art publication AT407555B to design a main and secondary exhaust control valves such that the main and the secondary exhaust control valves can be actuated by a single actuator. The main exhaust control valve is biased by a spring towards its extended position and can be moved to its retracted position through a coupling by the movement of the secondary exhaust valves. The secondary exhaust valves are coupled by a yoke which connects the secondary exhaust valves to the actuator. In trials this design has resulted in difficulties concerning the fit of the components of the exhaust control device in the corresponding guides in the cylinder block.

Thus there is a need for an improved exhaust valve assembly for a two-stroke internal combustion engine.

SUMMARY OF THE INVENTION

An aspect of embodiments of the invention provides an exhaust control valve assembly for a two-stroke internal combustion engine which is characterized by a technically efficient actuation of the main and the auxiliary exhaust valves.

Other aspects of embodiments of the present invention allow for a relatively small installation space, a simple mounting arrangement and a reliable operation of the exhaust control valve assembly.

According to preferred embodiment of the invention the proposed design of the exhaust control valve assembly reduces the danger of seizing of the main or the auxiliary exhaust valve in the corresponding guiding passages due to thermal expansion.

It is one of the objectives of the present invention to avoid the shortcomings addressed in the discussion of the prior art and to configure a device for controlling the exhaust period of a cylinder of a two-cycle internal combustion engine of the type described above that advantageous drive conditions and reliable functioning of the exhaust control valves can be achieved with a simple construction and a small installed size.

According to an aspect of the present invention this objective is achieved in that the auxiliary exhaust valve is connected to the actuator by the main exhaust valve. Contrary to solutions known in the prior art the auxiliary exhaust valve is coupled to the main exhaust valve such that, movement of the main exhaust valve will result in a simultaneous movement of the auxiliary movement. Having only the main exhaust valve directly connected to the actuator of the valve assembly the design is considerably simplified and the number of sources of error is reduced.

Since according to a further aspect the auxiliary exhaust valve is designed to be separate from the main exhaust valve, the thermal expansion of the main exhaust valve and the auxiliary exhaust valve can be easily compensated by providing an adequate clearance between these two components.

[Claim 2]

According to an aspect of the present invention the auxiliary exhaust valve is detachably connected to the main exhaust valve. By this measure it is possible to easily replace the exhaust valve during maintenance.

[Claim 3]

According to another aspect of the present invention the auxiliary exhaust valve is connected to the main exhaust valve via a positive direct connection. Contrary to other type of connections between two mechanical components, a positive connection is easily to design, reliable and cost efficient.

[Claims 4+5]

Other aspects of embodiments of the present invention allow the auxiliary exhaust valve being movably connected to the main exhaust valve. Since the auxiliary exhaust valve can slightly alter its position with respect to the main exhaust valve, the danger of seizing of the valve assembly can be significantly reduced.

[Claim 6]

According to a preferred embodiment of the present invention, the positive direct connection has a clearance for compensating thermal expansion of at least one of the main exhaust valve and the auxiliary exhaust valve. Since the exhaust control valves and the cylinder block, which accommodates the guiding passages for the exhaust control valves, are exposed to considerably high temperatures, these components undergo thermal expansion or contraction. This thermal expansion or contraction can on the one hand result in thermal tensions being introduced into the components and on the other hand prohibit movement of the control exhaust valves in their corresponding guiding channels. By providing an adequate clearance at the positive direct connection the thermal expansion of the components can be at least partially compensated in order to guarantee for a reliable operation of the inventive valve assembly.

[Claim 7]

According to an aspect of the present invention, each of the main exhaust valve and the auxiliary exhaust valve has an extended and a retracted position, the extended position of the main exhaust valve at least partially closing the main exhaust port, the extended position of the auxiliary exhaust port at least partially closing the auxiliary exhaust port, and the positive direct connection being provided in the direction of movement of the main exhaust valve as to couple the movement of the main exhaust valve and the auxiliary valve in between said extended and said retracted positions. According to a preferred embodiment of the present invention the positive direct connection between the auxiliary exhaust valve and the main exhaust valve couples the auxiliary exhaust valve to the main exhaust valve in the direction of movement of the main exhaust valve. At the same time the positive direct connection allows for a movement of the auxiliary exhaust valve in the two other independent directions, being perpendicular to the direction of movement of the main exhaust valve. This is realized by a slot provided in the main exhaust valve having a defined width in the direction of movement of the main exhaust valve. By this measure the auxiliary exhaust valve is couple to the main exhaust valve on the axis of movement of the main exhaust valve such that the movement of the main exhaust valve is carried over to the auxiliary exhaust valve. Contrary to that, the auxiliary valve can alter its position in the direction of the two other independent axes, being perpendicular to the axis of movement of the main exhaust valve, to such an extent, as the guiding passages, preferably foreseen in the cylinder, allow for this.

By providing this limited flexibility the valve assembly can compensate tilt in the guiding passages following for instance inhomogeneous thermal expansion of the engine components, which otherwise would result in jamming of the valve assembly.

[Claims 8+9+10]

According to a preferred embodiment of the present invention the main exhaust valve includes a recess and the auxiliary exhaust valve includes a protrusion facing the main exhaust valve, the protrusion fitting in the recess in order to establish the positive direct connection. This design has proofed to be efficient with regard to technical reliability and to cost.

[Claims 11+12+13]

According to another aspect of the present invention the main exhaust valve includes a protrusion and the auxiliary exhaust valve includes a recess facing the main exhaust valve, the protrusion fitting in the recess in order to establish the positive direct connection.

[Claim 14]

It is another aspect of the present invention to allow the main exhaust valve including a first and a second sliding valve, each having an extended and a retracted position, the second sliding valve being disposed on the first sliding valve.

By providing a two part main exhaust valve including a first and a second sliding valve three different setting for the exhaust port setting can be provided.

In a first setting the first and the second sliding valves are at their fully extended position thereby matching their free end faces to the cylinder bore, and limiting the opening of the exhaust port. In a second setting, typically used when the engine exceeds a predetermined threshold of engine speed, the first sliding valve is retracted and opens part of the exhaust port, while the second sliding valve still covering part of the exhaust port. In a third port time setting, typically used at high engine speeds, also the second sliding valve gets retracted and herewith the exhaust port is fully opened and the port timing is defined by the upper edge of the exhaust port as provided in the cylinder.

[Claim 15]
According to a preferred embodiment of the present invention both of the first and the second sliding valves include a free end face, each free end face having a control edge that is matched to the cylinder bore.

[Claim 16]
According to another preferred embodiment of the present invention the first sliding valve includes a recess and the auxiliary exhaust valve includes a protrusion facing the main exhaust valve, the protrusion fitting in the recess in order to establish the positive direct connection.

[Claim 17]
According to a further preferred embodiment of the present invention first sliding valve includes a protrusion and the auxiliary exhaust valve includes a recess facing the main exhaust valve, the protrusion fitting in the recess in order to establish the positive direct connection.

[Claim 18]
According to another preferred embodiment of the present invention the second sliding valve is connected to the actuator via the first sliding valve.

[Claim 19]
According to an additional embodiment of the present invention the second sliding valve is supported by the first sliding valve, the second sliding valve having a boss, the boss being contacted by the first sliding valve in order to move the second sliding valve from the second sliding valve's extended position to the second sliding valve's retracted position.

[Claim 20]
It is another aspect of the present invention where the cylinder block comprises a first passageway for accommodating the main exhaust valve and a second passageway for accommodating the auxiliary exhaust valve.

[Claim 21]
It is a further aspect of the present invention where the actuator includes a pneumatic chamber and a membrane, the position of the membrane being controlled by the pressure inside the pneumatic chamber and the membrane being connected to the main exhaust valve in order to alter the position of the main exhaust valve in response to the pressure inside the pneumatic chamber.

According to another preferred embodiment of the invention, the main exhaust valve and the auxiliary exhaust valve can be actuated by a mechanical actuator as disclosed in U.S. patent application Ser. No. 10/976,814 filed on Oct. 29, 2004 which is herewith incorporated by reference in its entirety.

[Claim 22]
According to an additional aspect of the present invention the actuator includes a adjusting drive, the adjusting drive being controlled by a electronic control unit as a function of engine speed and/or the load on the engine, the adjusting drive controlling the pressure inside the pneumatic chamber.

[Claims 23+25]
According to a preferred embodiment of the present invention the adjusting drive includes a solenoid.

[Claim 24]
According to an additional embodiment of the present invention the actuator includes a adjusting drive, the adjusting drive being controlled by a electronic control unit as a function of engine speed and/or the load on the engine.

[Claim 26]
According to an aspect of the present invention a first spring is provided, the first spring being connected to the auxiliary exhaust valve as to force the auxiliary exhaust valve into its said extended position.

[Claim 27]
According to another aspect of the present invention a second spring is provided, the second spring being connected to the main exhaust valve as to force the main exhaust valve into its said extended position.

[Claim 28]
According to a further aspect of the present invention the cylinder housing comprises a guiding passage, at least one of the main exhaust valve and the auxiliary exhaust valve including a first shoulder, the first shoulder resting against a second shoulder provided in the guiding passage as to establish the extended position of the at least one of the main exhaust valve and the auxiliary exhaust valve.

According to a preferred embodiment of the present invention both of the main exhaust valve and the auxiliary exhaust valve are designed as sliding valves, sometimes also referred to as exhaust outlet slides. It is especially advantageous if the sliding valves are arranged as to be guided in corresponding guiding passages in the cylinder block in order to reciprocate between their extended and retracted positions, dependent on the status of the engine parameters.

According to an aspect of the present invention one of the objectives of the present invention is achieved in that, in order to provide for the mutual adjustment of the set position of the main exhaust sliding valve and the set position of at least one auxiliary exhaust sliding valve, often also referred to as secondary exhaust sliding valve, there is a positive, direct connection between the main exhaust sliding valve and the auxiliary exhaust sliding valve. Optionally the positive direct connection provides for some clearance between the main exhaust sliding valve and the auxiliary exhaust sliding valve which allows the resulting limited "free play" between the components to compensate any tilt in the valve assembly.

By providing the positive, direct connection that allows some free play between the main exhaust sliding valve and the secondary exhaust sliding valve it is possible, in a simple way, to ensure advantageous drive conditions for the slide that is, at the same time, of simple construction and requires little installation space. Because of the simple coupling between the main exhaust sliding valve and the secondary exhaust sliding valve, the sliding valves are prevented from becoming tilted or jammed against one another, which can happen because of the different rates of thermal expansion of the individual slides.

This ensures reliable operation of the device for controlling the exhaust period according to the present invention. Since there is only a direct connection between the main exhaust sliding valve and the secondary exhaust sliding valve, it is possible to dispense with costly control mechanisms of the sort found in the prior art. This means that there are fewer failure-prone component parts, weight is reduced, and it is simpler to control the slides. According to the present invention, it has been possible to achieve the greatest possible peak torque in the upper engine-speed range with a concomitant increase of torque in the lower and middle engine-speed ranges. By incorporating a number of set positions for the slides, for example a middle position, it has been possible to improve the torque in the middle engine-speed range even more. If the set position of the sliding valves is matched continuously to the particular load on the internal combustion engine, particularly in the partial-load range, it is possible to achieve a significant improvement in emission values, although this entails considerable control costs.

The present invention relates to a device for controlling the exhaust period of a two-cycle internal combustion engine that has an exhaust passage that adjoins a main exhaust outlet from a cylinder, and at least one secondary exhaust passage that opens out from the cylinder, preferably into the exhaust passage. This device also incorporates a exhaust control valve, preferably of a sliding-valve type, that is arranged in the area of the wall of the exhaust passage that is proximate to the cylinder head so as to be adjustable; this exhaust control valve partially covers the vertical dimension of the main exhaust outlet with the help of a control edge that is matched to the cylinder bore when it is in its working position, in which it extends into the exhaust passage. The device also incorporates at least one slide valve for at least one secondary, sometimes referred as auxiliary, exhaust passage, it being possible to actuate said auxiliary exhaust sliding valve as a function of the position of the main exhaust control sliding valve.

Particularly simple construction conditions will result for the positive, direct connection that permits some free play and is located between the main exhaust sliding valve and the secondary exhaust sliding valve if either the secondary exhaust outlet sliding valve has a shoulder that faces the main exhaust outlet slide and fits in a corresponding groove in the main exhaust sliding valve, or the main exhaust sliding valve has at least one shoulder that faces at least one secondary exhaust sliding valve and fits in a corresponding groove in the secondary exhaust sliding valve. This means that not only can the positions of the sliding valves for the main exhaust outlet and the secondary exhaust outlet be adjusted in the direction of displacement of the slides by a common adjusting mechanism: it is also makes it possible to connect the main exhaust sliding valve and the secondary exhaust sliding valve by using a connection that costs very little to manufacture.

If, as viewed in the direction of adjustment of the sliding valves for the main exhaust outlet and the secondary exhaust outlet—which are preferably displaceable at least essentially parallel to each other—the width of the shoulder of the main exhaust sliding valve or of the secondary exhaust sliding valve is smaller than the width of the groove, it is possible to have independent opening times for the main exhaust sliding valve and the secondary exhaust sliding valve. For example, provision can be made such that after it has been partially opened, as it is adjusted more in the direction in which it opens, the main exhaust sliding valve causes the secondary exhaust sliding valve to move and thereby opens the secondary exhaust opening when the main exhaust opening is already open, at least in part.

The secondary exhaust sliding valve and/or the main exhaust sliding valve can be moved against the resistance of a spring from the working position—in which they extend into the secondary exhaust opening or the main exhaust opening—into a position that frees the secondary exhaust passages or the main exhaust passage, at least for the most part. This means that optionally the adjusting mechanism has only to be driven in one direction, which is to say so as to open up the exhaust passages, and there will always be a positive connection between the particular shoulder and the side of the groove that is connected to it.

In order to ensure an unequivocally defined closed position of the secondary exhaust slide and the main exhaust slide by simple means, according to one advantageous embodiment of the present invention it is proposed that the main exhaust slide or the secondary exhaust slide form a shoulder that, when in the working position, in which they extend into the particular outlet passage, they rest against a corresponding shoulder that is formed by the cylinder housing.

It is preferred that the set position of the slides be adjustable by an electronic control unit as a function of engine speed and/or the load on the engine through an adjuster drive, so that the adjusted position can be set over a wide range. It is preferred that the adjuster drive include a solenoid switch or servomotor that can be connected selectively through a Bowden cable with the slides so as to transmit a driving force, or acts directly or through gearing on the slide.

Various other systems can be used to operate the exhaust outlet slides, and included with the foregoing. According to corresponding embodiments, pneumatic, hydraulic, or mechanical operating devices can be used for adjusting the main and/or the secondary exhaust outlet slides. The operating device can incorporate gearing or, for example, a fork by which the position of the outlet slide can be adjusted in conjunction with a suitable pivoting device.

If the device for controlling the exhaust period of a cylinder of a two-cycle internal combustion engine is to be so simplified by using simple means that it becomes possible to match the exhaust period over a wider range of engine speeds without perceptibly degrading flow conditions in the area of the outlet passages when the slides are in the intermediate set positions, according to an advantageous embodiment of the present invention provision can be made such that the main exhaust outlet slide is configured as a double slide with two slide plates that can be moved toward one another; at their unattached face ends each of these has a control edge that is matched to the cylinder bore, so that the exhaust period can be shortened incrementally as a function of the set position of the slide plates.

Thus, it is possible to reduce the exhaust period in two increments, which permits the desired matching of the exhaust time to a greater range of engine speeds. Despite the incremental covering of the exhaust slot by two slide plates that can be adjusted transversely to the axis of the cylinder, comparatively favourable flow conditions can be achieved in the area of the exhaust passage. This is possible because, when they are in their starting position, the slide plates form a common face surface that conforms to the shape of the exhaust passage wall. This face surface can also be effective in the working position of the slide plate that is proximate to the cylinder head if the slide plate that is remote from the cylinder head is adjusted jointly with the slide plate that is proximate to the cylinder head. In order to reduce the exhaust period even more, all that is required is to move the slide plate that is remote from the cylinder head into its working position. When this is done, to a large extent the slide plate that is proximate to the cylinder head fills the dead space that is usually left between the slide plate that is remote from the cylinder head and the wall of the exhaust passage that is proximate to the cylinder head.

If the main exhaust outlet slide is configured as a double slide with two slide plates that can be moved towards one another, the positive, direct connection that allows some free play can be provided between one of the two slide plates of the main exhaust outlet slide and at least one secondary exhaust outlet slide as desired.

These and other aspects, advantages and features of the invention will become apparent in view of the following detailed description of the invention.

DETAILES DESCRIPTION OF THE DRAWINGS

Figure 2:
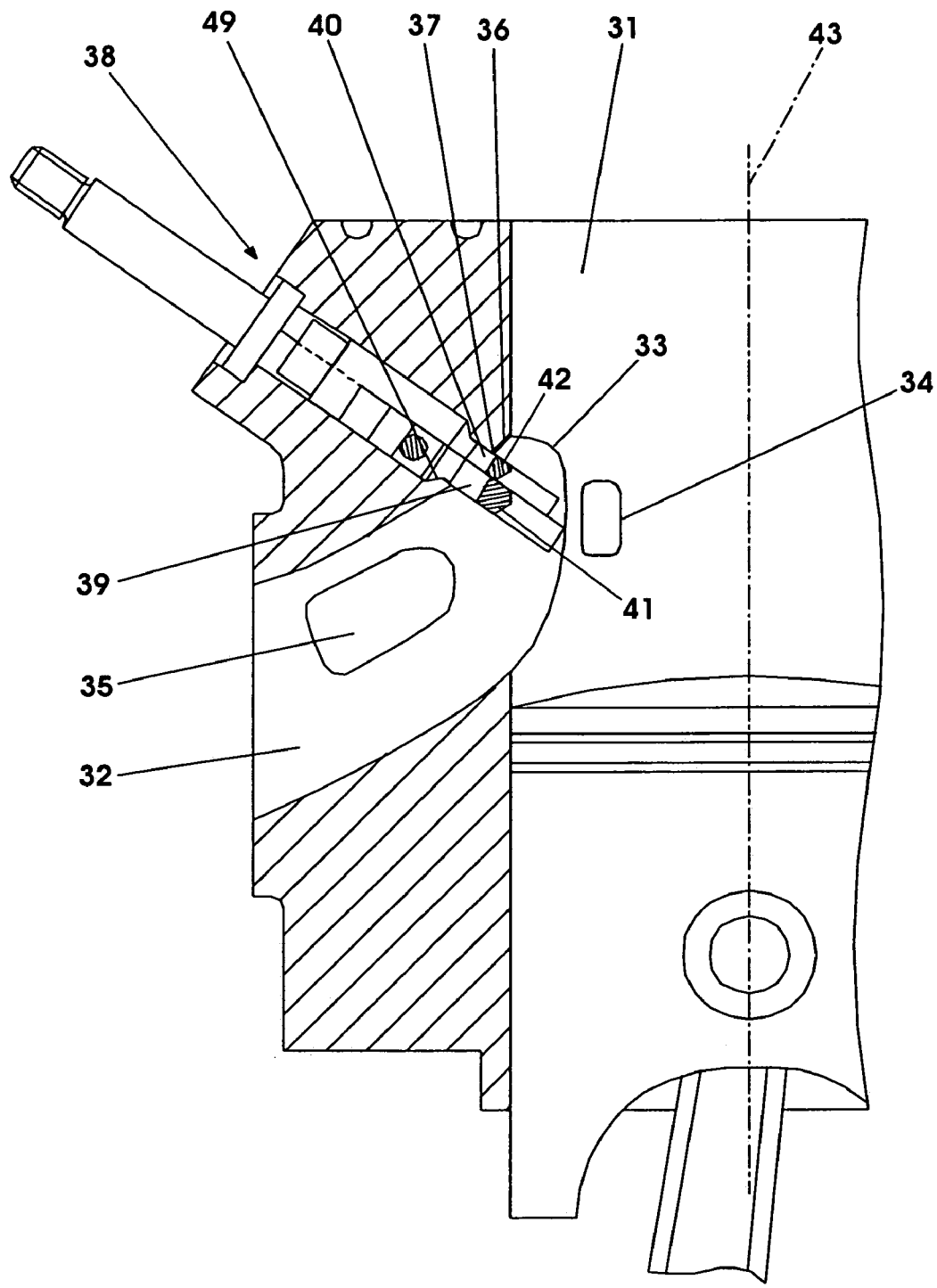
Figure 5:
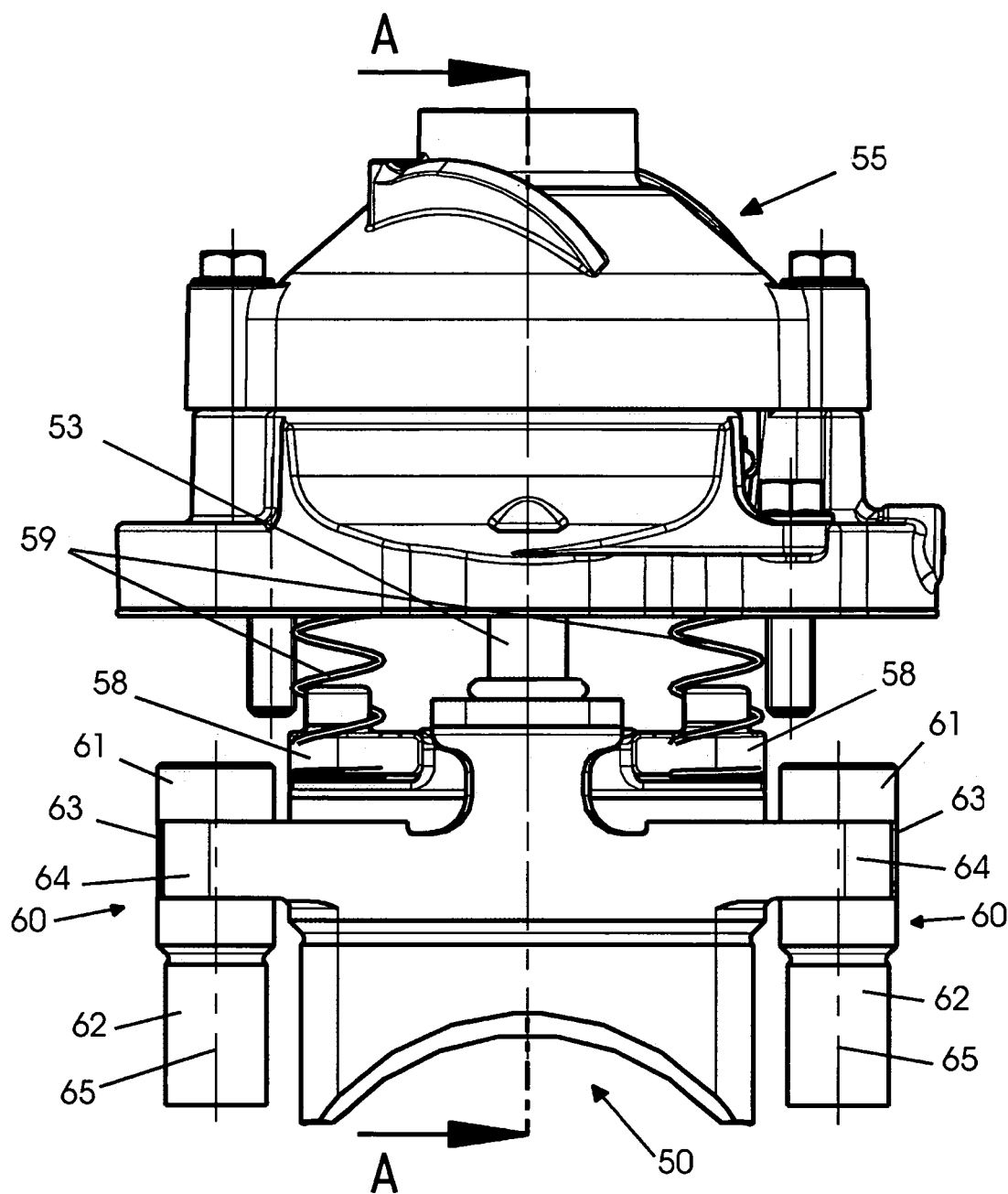
Figures 6, 7:
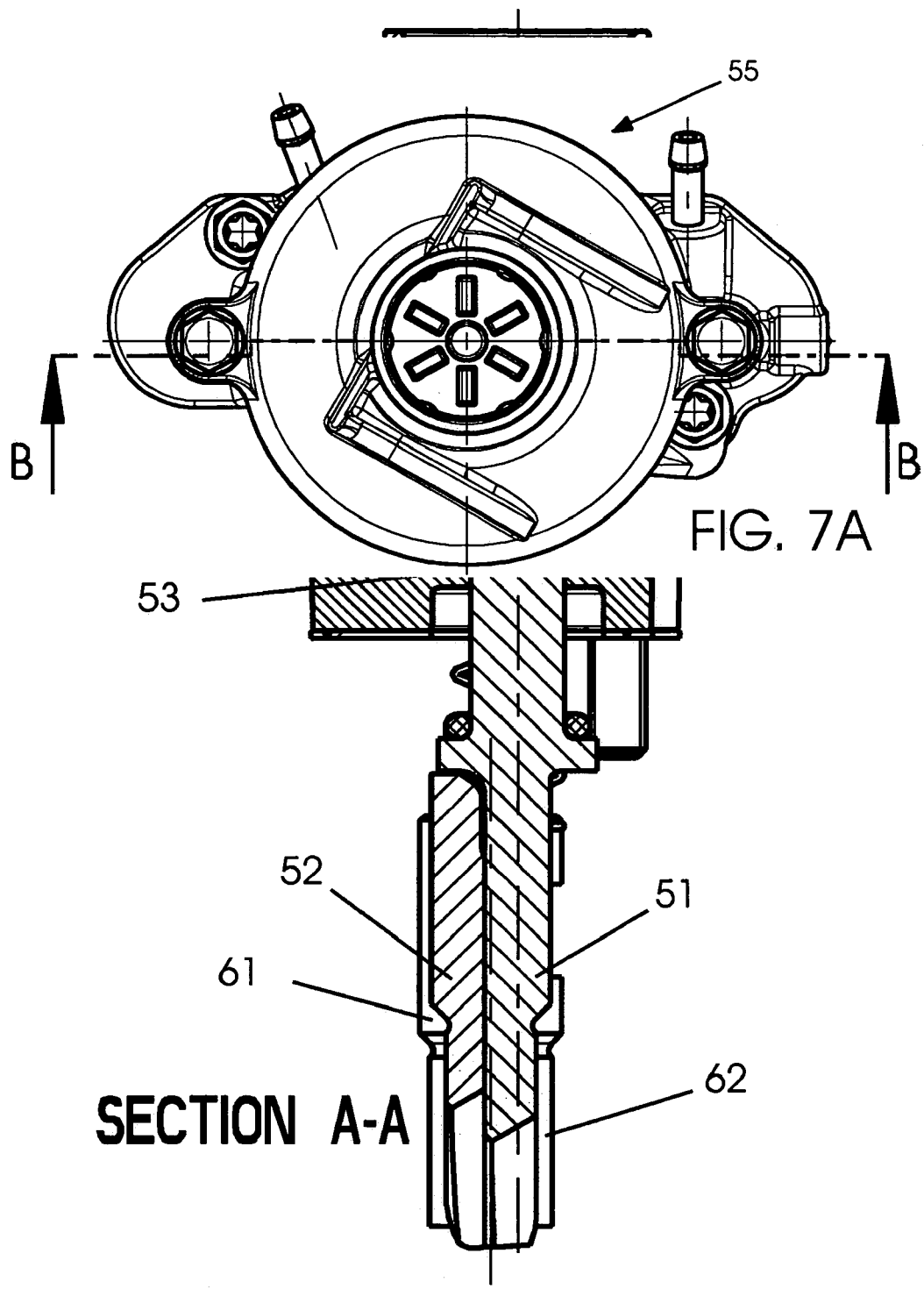

In the drawings which form part of this original disclosure, like elements are represented by like reference numerals FIG. 1: A cross-sectional view of a two-stroke engine with an exhaust port height adjustment valve assembly according to the prior art;

FIG. 2: A device according to the present invention for controlling the exhaust period of a cylinder of a two-cycle internal combustion engine, in axial cross section through the cylinder, in the area of the main exhaust opening;

FIG. 3A: The slide shown in FIG. 2, partially withdrawn from the starting position, at a reduced scale;

FIG. 3B: The slide shown in FIG. 2, completely withdrawn from the main exhaust passage, at a reduced scale;

FIG. 4A The slide shown in FIG. 2 and FIGS. 3A–3B, removed from the cylinder, shown in side view;

FIG. 4B The slide shown in FIG. 2 and FIGS. 3A–3B, removed from the cylinder, shown in plan view;

FIG. 5 Another preferred embodiment of a device according to the present invention for controlling the exhaust period of a cylinder of a two-cycle internal combustion engine, in plan view FIG. 6 The device as shown in FIG. 5 in a cross section along section plane A—A of FIG. 5

FIG. 7A The device as shown in FIGS. 5 and 6 in a top view

Figure 8:
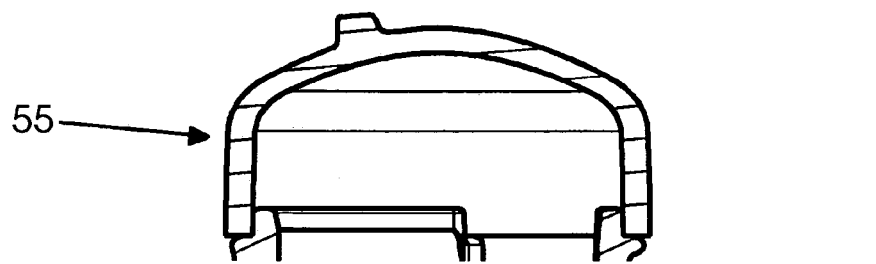
Figure 9:
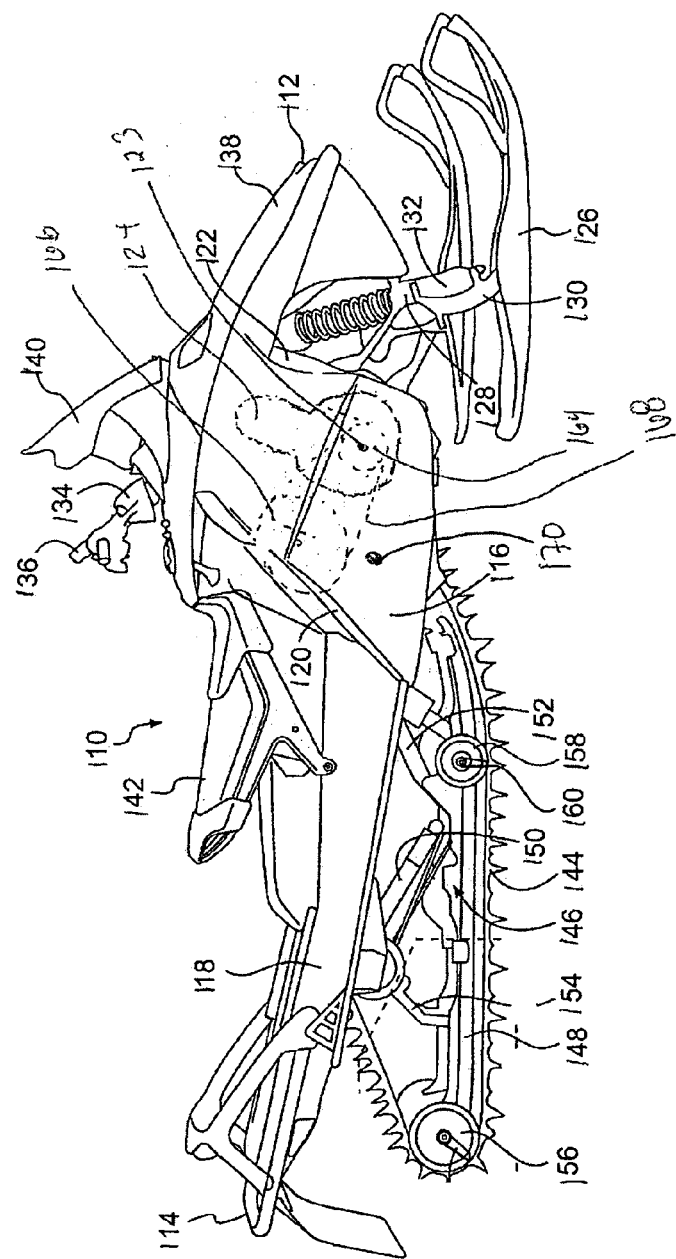

FIG. 7B The device as shown in FIGS. 5–7 in a cross section along section plane B—B in FIG. 7A FIG. 8 The device as shown in FIGS. 5–7B in a cross section along section plane C—C in FIG. 7B FIG. 9 A snowmobile having a two-cycle internal combustion engine using the device for controlling the exhaust period of FIGS. 1–8

FIG. 1 illustrates the valve assembly 10 located adjacent a two-stroke engine 11 as it is known in the prior art. Exemplary U.S. Pat. No. 6,244,277 shall be named, which is herewith incorporated by reference in its entirety. It is understood that the word "two-stroke engine" includes an engine having at least one cylinder such as a one, two, three or more cylinder engine. The engine 11 comprises a cylinder 12 having an exhaust port 13 and a crankcase 14 having an admission port 15 and an internal chamber 16. A piston 17 is reciprocable in the cylinder bore 18 and is adapted to open or close the exhaust port 13 and a transferring port 19. When the engine 11 is operating at low or medium speeds, the exhaust port 13 should not be exposed prematurely by the piston 17, as the latter moves downwardly. Such a premature exposure of the exhaust port 13 is prevented by a restricting member 20. This restricting member 20 is slidably mounted in a guide channel 21 having a longitudinal direction that is approximately radial with respect to cylinder bore 18 and extends at an acute angle to the axis of an exhaust passage 22. The exhaust passage 22 communicates with the exhaust port 13. The valve assembly 10 is adapted to actuate the restricting member 20 and comprises a valve piston 23 connected to the restricting member 20; a diaphragm 24 mounted with the valve piston 23 and gripped in the wall of the valve assembly 10 formed by a cover 25 and a valve housing 26; and a compression spring 27 which pushes on the restricting member 20 to maintain the restricting member 20 in a lower position wherein the edge 28 of the restricting member 20 protrudes into the exhaust port 13 and effectively lowers the height of the exhaust port. This position of the restricting member 20 is shown in FIG. 1.

A port 29 located in the valve housing 26 is connected to the crankcase 14 through an appropriate conduit 30. The pressurized air from the internal chamber 16 of the crankcase 14 is thereby connected to the diaphragm 24. The compression spring 27 creates a pre-load on the valve piston 23 in order that the restricting member 20 stays at the restrictive height position, at which it restricts the upper portion of the exhaust port 13.

FIG. 2-4B illustrate a preferred embodiment of the present invention. In the embodiment shown, the cylinder 31 of a two-cycle internal combustion engine has a main exhaust passage 32 that adjoins a main exhaust outlet 33 and side secondary exhaust outlets 34 that are disposed so as to be symmetrical to the main exhaust outlet 33; the side secondary exhaust outlets 34 are connected to the exhaust passage 32 by way of secondary exhaust passages 35. The wall 36 of the exhaust passage 32 that is proximate to the cylinder head forms a passage 37 for a main exhaust outlet slide valve 38 that is configured as a double slide with a first sliding plate 39 and a second sliding plate 40 that can be moved toward one another. Each of the slide plates 39, 40 has at its unattached end a control edge 41, 42 that is matched to the cylinder bore of the cylinder 31. The first and the second sliding plates 39, 40 can move at an acute angle to the cylinder axis 43 and almost perpendicularly to the wall 36 of the exhaust passage 32, between a position (FIG. 4A) in which it is withdrawn into the passage 37 and a position (FIG. 2) in which it is advanced against the cylinder housing. In the position shown in FIG. 2, in which the first and the second sliding plates 39, 40 are advanced against the cylinder housing, both sliding plates are advanced against the main exhaust outlet, in contrast to which, in FIG. 3, only the upper slide plate 42 is advanced toward the main exhaust outlet and the lower slide plate 41 has already been displaced at least partially towards its withdrawn position. In FIG. 4A, the two sliding plates 39, 40 are shown in their position that is withdrawn in the direction of the passage 37.

Parallel to the passage for the main exhaust outlet slide 38, in the area of the side passages 35 there are receiver bores (not shown in greater detail) for the secondary exhaust outlet slides that are associated with the side channels. Within their associated receiver bores, these can move between a position that releases the side passage 35 and one that blocks the side passage 35. A positive direct connection, which allows some free play, is provided between the main exhaust outlet slide 38 and the secondary exhaust outlet slide 44 so as to allow adjustment the set position of the control slide 38 for the main exhaust outlet 23 and of the secondary exhaust outlet slides 44 of the two secondary outlets 34. The direct connection includes a shoulder 45 that is formed from the secondary exhaust outlet slide 44 that faces toward the main exhaust outlet slide 38. This shoulder 45 fits in a corresponding groove 46 in the main exhaust outlet slide 38 that is formed from the slide plate 39, and is moved in the direction of movement when the main exhaust outlet slide 38 is displaced.

As viewed in the direction of adjustment for the main exhaust outlet slide and the secondary exhaust outlet slide, which can be displaced parallel to one another, the width of the shoulder 45 is smaller than the width of the groove 46 so that—on the one hand—it is possible to prevent mutual jamming of the slides, which can occur because of their different rates of thermal expansion and—on the other hand—different control times for the main exhaust outlet slide and the secondary exhaust outlet slide can be set up. Both the main exhaust outlet slide 38 and the secondary exhaust outlet slide 44 have a shoulder 47, 48 which, in the working position in which they extend into the secondary exhaust passage 35 or into the main exhaust passage 32, lies against a corresponding shoulder 49 that is formed by the cylinder housing.

FIG. 5-8 illustrate another preferred embodiment of the present invention. A main exhaust valve 50 is disclosed having a first sliding valve 51 and a second sliding valve 52. In operation the second sliding valve 52 being disposed above the first sliding valve 51, the second sliding valve 52 being supported by the first sliding valve. As can be further seen from FIGS. 5–8, the first sliding valve 51 is connected by a connector 53 with a membrane 54 being disposed in a pneumatic actuator 55. It is well-understood that according to a preferred embodiment of the present invention the connector 53 is made one-piece with the first sliding valve 51. As the connector 53 is attached to the membrane 54, the connector 53 and the first sliding valve 51 follows any movement of the membrane 54 and therefore retracts if gas is guided in the pressure chamber 56. In this case the membrane 54 will move against the bias of a pre-stressed pressure spring 57. If pressure in the pressure chamber 56 decreases, the pressure spring 57 will move the membrane 54 as to deflate the pressure chamber 56 and move the connector 53 and the first sliding valve to their extended position as displayed in FIGS. 5–8.

As can be best seen in FIGS. 5, 7B and 8, the second sliding valve 52 has shoulders 58 which project such into passage of movement of the first sliding valve 51 such that the second sliding valve 52 will follow the movement of the first sliding valve 51 when the first sliding valve 51 is moved to its retracted position. Pressure springs 59 are provided to move the second sliding valve 52 into its extended position once the first sliding valve 51 moves into its extended position.

As illustrated in FIGS. 5–8 the control exhaust valve assembly further comprises secondary exhaust valves 60 specifically designed to allow a at least partially closure of the secondary exhaust passages 35 of the corresponding internal combustion engine to which the presented valve assembly is applied to. The secondary exhaust valves 60 comprise a first section used for coupling them to the main exhaust valve 50 and a second section 62 of, compared to the first section, being used for intruding the secondary exhaust passage 35 in order to at least partially close it.

As can be clearly seen in FIGS. 5 and 7B, the secondary exhaust valves include apertures 63 in their first sections 61 which allow for engagement of corresponding projections 64 integrally formed with the first sliding valve 62. By the positive connection between the apertures 63 and the projections 64 the secondary exhaust valves 60 can be coupled to the main exhaust valve 50, preferably to the first sliding valve 51. Since the positive direct connection between the apertures 63 and projections 64 is designed to have a predetermined clearance, the thermal expansion of the materials used can be easily compensated. Due to the character of the positive direct connection presented the secondary exhaust valves 60 can not move any further the clearance provides for in the direction of the axes 65 with respect to the first sliding valve 51. However, the secondary exhaust valves may alter their position with respect to the first sliding valve in the two other independent axes perpendicular to the axes 65, to the extent the guiding channels which are designed for guiding the secondary exhaust valves 60 in the cylinder block of the cylinder 31, allow for.

Though the guiding channels usually provide for a close guidance of the main and the secondary exhaust valves 50, 60, the loosely connection between the main and the secondary exhaust valve 50, respectively between the connector 53 and the pneumatic actuator 55 on the one hand and the secondary exhaust valve 60 on the other hand helps preventing the valve assembly being jammed or seized in the corresponding guiding passages in the cylinder block.

The internal combustion engine according to the present invention can be used to drive different machines and vehicles, for example, motor sleds, watercraft—in particular personal watercraft (PWCs)—motorcycles, all-terrain vehicles (ATVs) or other vehicles used in the sport and leisure domains.

The inventive internal combustion engine is suitable for use on a snowmobile 110 such as that shown in FIG. 9. FIG. 9 shows a snowmobile incorporating the present invention and is identified generally by the reference numeral 110. The snowmobile 110 includes a forward end 112 and a rearward end 114, which are defined consistently with the travel direction of the vehicle. The snowmobile 110 further includes a chassis 116 which normally includes a rear tunnel 118, an engine cradle portion 120 and a front suspension assembly portion 122. An 2-stroke internal combustion engine 124 which is schematically illustrated by broken lines is mounted to the engine cradle portion 120 of the chassis 116. A ski and steering assembly (not indicated) is provided, in which two skis 126 are positioned at the front end 112 of the snowmobile 110, and are attached to the front suspension assembly portion 122 of the chassis 116 through a front suspension assembly 128. The front suspension assembly 128 includes ski legs 130, supporting arms 132 and ball joints (not shown) for operatively joining the respective ski legs 130, supporting arms 132 and a steering column 134. The steering column 134 at its upper end is attached to a steering device such as handlebars 136 which is positioned forward of a driver (not shown) and behind the engine 124 to rotate the ski legs 130 and thus the skis 126, in order to steer the vehicle.

At the front end 112 of the snowmobile 110 there are provided fairings 138 that not only protect the engine 124, but can also be decorated to make the snowmobile 110 more aesthetically pleasing. A windshield 140 may be connected to the fairings 138 near the front end 112 of the snowmobile 110 or may be attached directly to the handlebars 136. The windshield 140 acts as a wind screen to lessen the force of air on the driver while the snowmobile 110 is traveling. A seat 142 is provided on the rear tunnel 118 to position the driver and any rider of the vehicle.

An endless drive track 144 is positioned at the rear end 114 of the snowmobile 110, and is disposed under rear tunnel 118, being operatively connected to the engine 124 via CVT 162. CVT 162 includes a drive pulley 164 rotating with an output shaft 123 of the engine 124, a driven pulley 166 as well as an endless drive belt 168 connecting the drive pulley 164 with the driven pulley 166 in a manner as well known by the man skilled in the art. One skilled in the art would recognize that the driven pulley 166 could be directly connected to a front drive axle 170 or it could be connected to the front drive axle 170 via a gear reduction unit (not shown) in order to rotate the endless drive track 144.

Thus, the endless drive track 144 is driven to run about a rear suspension assembly 146 for propulsion of the snowmobile 110. The rear suspension assembly 146 includes a pair of slide rails 148 in sliding contact with the endless drive track 144. The rear suspension assembly 146 also includes one or more shock absorbers 150 which may further include a coil spring (not shown) surrounding the individual shock absorbers 150. Front and rear suspension arms 152, 154 are provided to attach the slide rails 148 to the chassis 116. One or more idler wheels which include a pair of rear idler wheels 156 and a pair of other idler wheels 158, are also provided in the rear suspension assembly 146.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. An internal combustion engine comprising:
   a crankcase;
   a crankshaft disposed in the crankcase;
   a cylinder block connected to the crankcase, the cylinder block having a cylinder disposed therein;
   a main exhaust port in fluid communication with the cylinder, the main exhaust port having a cross-sectional area;
   an auxiliary exhaust port in fluid communication with the cylinder, the auxiliary exhaust port having a cross-sectional area smaller than the cross-sectional area of the main exhaust port;
   a piston movably disposed within the cylinder and being operatively connected to the crankshaft;
   an exhaust valve assembly, the exhaust valve assembly comprising:
      a main exhaust valve for at least partially closing the main exhaust port;
      an auxiliary exhaust valve for at least partially closing the auxiliary exhaust port, the auxiliary exhaust valve being separate from and movably connected to the main exhaust valve;
      an actuator for actuating the main exhaust valve and the auxiliary exhaust valve; the actuator being connected to the main exhaust valve;
      the auxiliary exhaust valve being connected to the actuator via the main exhaust valve;
   and the engine operating on a two-stroke principle.

2. The internal combustion engine of claim 1, wherein the auxiliary exhaust valve is detachably connected to the main exhaust valve.

3. The internal combustion engine of claim 1, wherein the auxiliary exhaust valve is connected to the main exhaust valve via an interlocking connection.

4. The internal combustion engine of claim 3, wherein the interlocking connection has a clearance for compensating for thermal expansion of at least one of the main exhaust valve and the auxiliary exhaust valve.

5. The internal combustion engine of claim 4, wherein the main exhaust valve includes one of a recess and a protrusion configured to mate with the recess, and the auxiliary exhaust valve includes the other of the recess and the protrusion, the protrusion mating with the recess into order to establish the interlocking connection.

6. The internal combustion engine of claim 3, wherein the main exhaust valve is movable in a direction of movement between an extended and a retracted position, the extended position of the main exhaust valve at least partially closing the main exhaust port, and wherein the auxiliary exhaust valve has an extended and a retracted position, the extended position of the auxiliary exhaust port at least partially closing the auxiliary exhaust port; the interlocking connection being provided in the direction of movement of the main exhaust valve so as to couple the movement of the main exhaust valve and the auxiliary valve.

7. The internal combustion engine of claim 6, wherein the main exhaust valve includes one of a recess and a protrusion configured to mate with the recess, and the auxiliary exhaust valve includes the other of the recess and the protrusion, the protrusion mating with the recess into order to establish the interlocking connection.

8. The internal combustion engine of claim 6, further comprising a spring connected to the auxiliary exhaust valve so as to bias the auxiliary exhaust valve in its extended position.

9. The internal combustion engine of claim 6, further comprising a spring connected to the main exhaust valve so as to bias the main exhaust valve in its extended position.

10. The internal combustion engine of claim 3, wherein the main exhaust valve includes one of a recess and a protrusion configured to mate with the recess, and the auxiliary exhaust valve includes the other of the recess and the protrusion, the protrusion mating with the recess into order to establish the interlocking connection.

11. The internal combustion engine of claim 1, wherein the main exhaust valve includes a first and a second sliding valve, each having an extended and a retracted position, the second sliding valve being disposed on the first sliding valve.

12. The internal combustion engine of claim 11, wherein both of the first and the second sliding valves include a free end face, each free end face having a control edge that is matched to a cylinder bore of the cylinder.

13. The internal combustion engine of claim 11, wherein the first sliding valve includes one of a recess and a protrusion configured to mate with the recess, and the auxiliary exhaust valve includes the other of the recess and the protrusions, the protrusion mating with the recess in order to establish the interlocking connection.

14. The internal combustion engine of claim 11, wherein the second sliding valve is connected to the actuator via the first sliding valve.

15. The internal combustion engine of claim 14, wherein the second sliding valve is supported by the first sliding valve, the second sliding valve having a boss, the boss being contacted by the first sliding valve in order to move the second sliding valve from the second sliding valve's extended position to the second sliding valve's retracted position.

16. The internal combustion engine of claim 1, wherein the cylinder block comprises a first passageway for accommodating the main exhaust valve and a second passageway for accommodating the auxiliary exhaust valve.

17. The internal combustion engine of claim 1, wherein the actuator includes a pneumatic chamber and a membrane, the position of the membrane being controlled by pressure inside the pneumatic chamber and the membrane being connected to the main exhaust valve in order to alter the position of the main exhaust valve in response to the pressure inside the pneumatic chamber.

18. The internal combustion engine of claim 17, wherein the actuator includes a drive unit, the drive unit being controlled by an electronic control unit as a function of at least one of engine speed and load on the engine, the drive unit controlling the pressure inside the pneumatic chamber.

19. The internal combustion engine of claim 1, wherein the actuator includes a drive unit, the drive unit being controlled by an electronic control unit as a function of at least one of engine speed and load on the engine.

20. The internal combustion engine of claim 1, wherein the cylinder block includes a guiding passage, and at least one of the main exhaust valve and the auxiliary exhaust valve includes a first shoulder, the first shoulder resting against a second shoulder provided in the guiding passage so as to establish the extended position of the at least one of the main exhaust valve and the auxiliary exhaust valve.

* * * * *